United States Patent
Chigrinov et al.

(10) Patent No.: US 7,783,144 B2
(45) Date of Patent: Aug. 24, 2010

(54) ELECTRICALLY TUNABLE MICRORESONATORS USING PHOTOALIGNED LIQUID CRYSTALS

(75) Inventors: Vladimir G. Chigrinov, Hong Kong (CN); Linjie Zhou, Hong Kong (CN); Alexander A. Muravsky, Minsk (BY); Andrew Wing On Poon, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 11/739,367

(22) Filed: Apr. 24, 2007

(65) Prior Publication Data

US 2007/0258677 A1 Nov. 8, 2007

Related U.S. Application Data

(60) Provisional application No. 60/794,128, filed on Apr. 24, 2006.

(51) Int. Cl.
G02B 6/26 (2006.01)
G02B 6/42 (2006.01)

(52) U.S. Cl. .......................................... 385/30; 385/15

(58) Field of Classification Search .................... 385/30, 385/15
See application file for complete search history.

(56) References Cited

U.S. PATENT DOCUMENTS 5,044,712 A 9/1991 Soret
5,111,321 A * 5/1992 Patel .......................... 349/198
5,825,448 A * 10/1998 Bos et al. ..................... 349/128
6,195,187 B1 2/2001 Soret et al.
6,404,472 B1* 6/2002 Andreatta et al. ........... 349/123
6,582,776 B2 6/2003 Yip et al.
2002/0076149 A1* 6/2002 Deacon ....................... 385/27
2002/0172466 A1 11/2002 Baumann et al.
2003/0063884 A1* 4/2003 Smith et al. ................. 385/129
2003/0072896 A1* 4/2003 Kwok et al. ................ 428/1.23
2003/0202730 A1* 10/2003 Fujieda et al. ................. 385/14
2003/0231279 A1 12/2003 Wessel et al.
2004/0150268 A1* 8/2004 Garito et al. .................. 310/12
2006/0023997 A1 2/2006 Almeida et al.
2006/0051010 A1 3/2006 Chu et al.

OTHER PUBLICATIONS

Z.Liu, V.V.Presnykov, and V.G.Chigrinov, "Photo-alignment of Liquid crystal in hollow optical fiber", XVI CLC 2005, Stare Jablonki, Poland (2005).
H.Desmet, W.Bigaerts, A.Adamski, J.Beeckman,K.Neyts, and R.Baets,"Silicon-on-insiulator optical waveguides with crystal cladding for switching and tuning" ECOC'03 3,430-431(2003).
H.S.Kwok, V.Chigrinov, H.Takada, and H.Takatsu, "New developments in liquid rrystal photo-aligning by azo-dyes", IEEE/OSA J.of Disp.Techn.1,41-50(2005).

(Continued)

*Primary Examiner*—Charlie Peng
*Assistant Examiner*—Jerry Blevins
(74) *Attorney, Agent, or Firm*—Schwabe, Williamson & Wyatt

(57) ABSTRACT

An electrooptically tunable waveguide-coupled microresonator. In one example embodiment, the switch includes a photoalignment layer that enhances control of liquid crystal alignment in the cladding near the coupling region of the microresonator and waveguide.

15 Claims, 17 Drawing Sheets

OTHER PUBLICATIONS

G.T.Reed and A.P.Knoights, Silicon Photonics, (John Wiley, Chichester UK 2004).

L.Paveis and D.J. Lockwood (Eds.), Silicon Photonics,(Springer-Verlag,Berlin,Germany 2004).

S.W.Leonard,J.P.Mondia, H.M. van Driel,O.Toader, S,John,K. Busch, A.Birner,U.Gosele and V.Lehmann,Tuneable Two-dimensional photonic crystals using liquid-crystal infiltration, Phys,Rev. B.61 R2389-R2392(2000).

S.M.Weiss, H.Ouyang,J.Zhang, and P.M. Fauchet, "Electrical and thermal modulation of silicon photonic bandgap microcavities containing liquid crystals." Opt. Express 13, 1090-1097 (2005).

A.Zhang,.K.T.Chan, M.S.Demokan,V.W.C.Chan,P.C.H.Chan, "Integrated liquid crystal optical switch based on total internal reflection", Appl.Phys.Lett. 86, 211108(2005).

B.Maune, R.Lawson,C.Gunn,A.Scherer, and L.Dalton.,"Electrically tunable ring resonators incorporating nematic liquid crystals as cladding layers", Appl.Phys. Lett. 83,4689-4691(2003).

V.G.Chigrinov, Liquid Crystal Devices:Physics and Applications, (Artech House,1999).

P. Yeh and C.Gu,Optics of Liquid Crysral Displays(John Wiley & Sons, Inc,1999).

R.A.Soref and B.R.Bennett, "Electropticals effects in silicon" IEEE J.Quant. Electrons.23,123-129(1987).

Y.A.Nastishin, R.D.Polak, S.V.Shiyanovskii, V.H.Bodnar,and O.D. Lavrentovich, Nematic Polar anchoring strength measured by electic field techniques, J.Appl. Phys. 86,4199-4213 (1999).

B.Zhang, P.Sheng, and H.S.Kwok, "Optical measurement of azimutheal anchoring strength in nematic liquid crystals", Phys.Rev. E67,041713(2003).

M.Kimura, Y.Ohta, and T.Akahane, "Surface azimuthal anchoring energy between the trapezoid grating surface and nematic liquid crystal layer studied by finite elements method", advances in technology of materials and materials rrocessing,7[2],91-96 (2005).

D.W.Berreman, Solidsurface shape and the alignment of an adjacent nematic liquid crystals,Phys.Prev.Lett.28,1683-1686(1972).

V.A.Barachevsky:Proc.SPIE 1559(1991) 184.

M.Schadt,K.Schmitt, V.Kozinkov, and V.Chigrinov:Jpn. J. Appl. Phys. 31 (1992) 2155.

Y.Limura,T.Saitoh,S.Kobayashi, and T.Hashimoto: J.Photopolym. Sci.Technol.8 (1995) 257.

M.Schadt, H.Seiberle, and A.Schuster:Nature 381 (1996) 212.

N.Kawatsuki, H.Ono, H.Takatsuka, T.Yamamoto, and O.Sangen: Macromolecules 30 (1997) 6680.

N.Kawatsuki,H.Takatsuka,and T.Yamamoto, Jpn. J. Appl. Phys. 39 (2000) L230.

N.Kawatsuki, K.Matsuyoshi, M.Hayashi, H.Takatsuka,T. Yamamoto, Chem. Mater.12 (2000) 1549.

N.Kawatsuki, K.Kato, T.Shiraku, T.Tachibana, and H.Ono: Macromolecules 39 (2006) 3245.

N.Kawatsuki, M.X.An, Matsuura, T.Sakai, H.Takatsuka: Liq. Cryst. 31 (2004) 55.

Xihu Li, Vladimir M. Kozenkov, Fion Sze-Yan Yeung, Peizhi Xu, Vladimir G. Chigrinov and Hoi-Sing Kwok "Liquid-Crystal Photoalignment by Super Thin Axo Dye Layer" Jpn. J. Appl. Phys., 45, No.1A, pp. 203-205 (2006).

Baolong Zhang, KuenKuen Li, Vladimir G. Chigrinov, Hoi-Sing Kwok and Ho-Chi Huang, "Application of Photoalignment Technology to liquid-crystal-on-silicon microdisplays", JJAP 44, 3983-3991 (2005).

* cited by examiner

ELECTRICALLY TUNABLE MICRORESONATORS USING PHOTOALIGNED LIQUID CRYSTALS

CROSS-REFERENCE TO RELATED APPLICATIONS

This application claims priority from U.S. provisional patent application 60/794,128 filed on Apr. 24, 2006, which is hereby incorporated by reference.

BACKGROUND AND SUMMARY OF THE INVENTION

The present application relates to optical devices, and more particularly to an electrically tunable microresonator using photoaligned liquid crystal as a cladding.

DESCRIPTION OF BACKGROUND ART

The present invention relates to the field of electrooptic switches for wavelength-selective routing of waveguided light.

Planar optical microresonators that partially confine light by total internal reflection in micrometer-size dielectric structures on substrates and support sharp optical resonances have long been demonstrated as integrated optic filters, multiplexers, and demultiplexers for wavelength-division-multiplexed (WDM) communications, and as wavelength-agile components for non-communications applications such as biochemical sensing. As the sharp optical resonances are highly sensitive to small changes in refractive index, micro-resonator-based optical switches, sensors, and modulators that are based on refractive index modulation have also been proposed and demonstrated. Conventionally, much of the planar optical microresonator-based passive devices (filters) and active devices (switches, modulators, light sources) have been demonstrated in III-V compound semiconductor materials (e.g. GaAs and InGaAsP systems). Planar optical microresonator-based passive and active devices have also been demonstrated on compound glass and polymer substrates. However, these photonic and optoelectronic devices are not readily compatible with mainstream silicon microelectronics, and thus cannot readily leverage from the multi-billion-dollar establishment of the silicon microelectronics industry.

Over the past few years (since ~2002), we see a serge of renewed interest in the research field of silicon-based photonics technology, partly motivated by the potential of using silicon-based optoelectronics to replace copper wires as interconnect on silicon microelectronic chips. Silicon photonics technology also appear as potentially low-cost and mass-producible integrated optic technology as the device fabrication is largely compatible with mainstream silicon microelectronics fabrication processes. Moreover, silicon is transparent to the near-infrared telecommunication wavelengths, thus enabling telecommunication signals to be directly input and output coupled through optical fibers and processed on a silicon photonic chip without converting the optical signals to electrical signals. Thus, we see substantial research and technological interest in silicon-based microresonator devices.

However, realization of silicon-based electro-optical devices can be a challenge as silicon only exhibits weak linear electro-optic effect. In order to realize electro-optical tuning in silicon, the free-carrier plasma dispersion effect is usually adopted to vary the silicon refractive index by free carrier injection, and thus result in tuning of the guided mode. Yet, the tuning range is limited as the refractive index change is only on the order of $10^{-3}$, and also the free carriers induce light absorption that causes additional cavity losses.

In order to attain a wide tuning range for silicon-based microresonator devices, thermo-optic effect and micromechanical devices have been employed to dynamically control the resonance wavelengths. However, thermal flow in micrometer-size silicon devices is difficult to control and localize as silicon is a good thermo-conductive material. Thus, the thermal influence on neighboring devices in a large-scale integration is hard to be totally avoided and thermal-induced cross-talk talk is likely to exist. Micromechanical devices can also be used to control the resonance wavelength by mechanically tuning the optical length of the microcavity. Yet such micromechanical tunable microresonator devices have mechanical moving parts that may not be desirable for long-term device reliability.

BRIEF REVIEW OF PRIOR ART REFERENCES

The following recites a brief overview of prior art references, all of which are hereby incorporated by reference.

U.S. Pat. No. 6,582,776 (2003), W. C. Yip, E. Prudnikova, H. S. Kwok, V. Chigrinov, V. Kozenkov, H. Takada, M. Fukuda, "Method of manufacturing photo-alignment layer" discloses the chemical compositions of the photosensitive azo-dyes used for photoalignment and the fabrication process for the photo-alignment layers. A photo-alignment layer having excellent long-term stability to light and heat is manufactured by coating a material for the photo-alignment layer, which contains a dichroic dye having two or more polymerizable groups per molecule, on a substrate, and exposing the coating layer to polarized light, thereby imparting a photo-alignment function, and polymerizing the polymerizable groups by heating or light exposure.

Dwight. W. Berreman 'Solid Surface Shape and the Alignment of an Adjacent Nematic Liquid Crystal', Phys. Rev. Lett,. 28, pp. 1683-1686 (1972) explains the nature of liquid crystal alignment by profile, considers possible alignment conditions and derives equations. The role of aligning material for liquid crystal alignment was ignored.

Brett Maune, Rhys Lawson, Cary Gunn, Axel Scherer, and Larry Dalton, "Electrically tunable ring resonators incorporating nematic liquid crystals as cladding layers", Appl. Phy. Lett., 83 pp. 4689-4691 (2003) demonstrates electrical tuning in ring resonators fabricated from silicon-on-insulator wafers by incorporating nematic liquid crystals (NLCs) as the waveguide top and side cladding material. The liquid crystal is spin-coated onto the wafer with no alignment layer. Photolithographically defined electrodes on the device plane provide a lateral electric field distribution to orient the NLCs azimuthally along the ring resonator circumference in order to modulate the cladding refractive index, and thereby modulating the resonant wavelengths of the ring resonator. With no alignment layer, the NLC at zero applied voltage is essentially randomly oriented, decreasing the realignment effect of the applied electric field, which was insufficient to achieve complete NLC alignment. This results in the ability to create only small shifts in the microring resonator's free spectral range.

U.S. Pat. No. 5,044,712 (1991), Richard A. Soref, "Waveguided Electrooptic Switches Using Ferroelectric Liquid Crystals" discloses a tiny, high speed, and low cost electrooptic switch having co-planar waveguides of silicon oxynitride and a ferro-electric liquid crystal layer overlying the waveguides. A voltage source causes the molecular optic axis of the liquid crystal to rotate 45-90 degrees within the plane of the liquid crystal layer to cause a change of state of the switch.

U.S. Patent application 231279 (2003), Wessel Rudolf, Bulow Henning, Pfeiffer Thomas, Berroth Manfred, "Liquid Crystal Phase Modulator on Integrated Optical Circuit" discloses a tunable optical device comprising an optical waveguide structured on a substrate with an inclusion of liquid crystal in the direct vicinity of the waveguide core. The liquid crystal is confined by replacing the cladding material of that integrated structure. The refractive index tuning of the liquid crystal influences the waveguide mode refractive index. This refractive index tuning is sufficiently large to enable control of the flow of optical signals transmitted through it. The tuning is advantageously achieved by applying an electric field via electrode on a segment of that core confined with liquid crystals. U.S. Patent application 0023997 (2006), Vilson Rosa de Almeida, Carlos Angulo Barrios, Roberto R. Panepucci, Michal Lipson, "Optically Controlled Photonic Switch" discloses all-optical switching of light on silicon, using highly light confining structures to enhance the sensitivity of light to small changes in refractive index. In one embodiment, the light confining structures are silicon micrometer-size planar ring resonators.

U.S. Patent application 0051010 (2006), Sai Chu, Frederick G. Johnson, Oliver King, Marcus Schuetz, Brent Little, "Coupled Optical Waveguide Resonators with Heaters for Thermo-Optic Control of Wavelength and Compound Filter Shape" discloses an integrated optical device comprising a substrate, optical waveguide, and compound optical resonator having a temperature sensor, at least two coupled optical resonators, and a heater localized to each optical resonator. An optical input signal is coupled to one of the resonators making up the compound resonator to form an optical output signal. The center wavelength and shape of the output signal is optimized with a feedback loop using the temperature sensor to control the power dissipated in at least one of the localized heaters. The power dissipated in the remaining resonator heaters is set according to a predetermined function having as an input variable the power dissipated in the resonant heater under control of the said feedback loop.

U.S. Patent application 172466 (2002), Baumann Frieder Heinrich, Dinu Mihaela, Stuart Howard Roy, Walker James Albert, "Micromechanically Active Reconfigurable Optical Add-Drop Filters" discloses a tunable, reconfigurable optical add-drop filter comprising a pair of optical waveguides optically coupled by a microring or microdisk resonator wherein the coupling distance between the resonator and at least one of the waveguides is micromechanically controllable. With this arrangement, the degree of coupling can be tuned after fabrication to provide high level extinction of dropped wavelengths and the filter can be dynamically reconfigured. U.S. Pat. No. 6,195,187 (2001), Richard A. Soref, Brent E. little, "Wavelength-Division Multiplexed M×N×M Cross-Connect Switch Using Active Microring Resonators" discloses large-scale switching array architectures for multiwavelength routing, employing absorption-switched micro-ring resonator 2×2 switches at all optical cross-points of each of a plurality of series-connected waveguide crossbar matrix switches. The architecture eliminates detrimental waveguide crossovers. Two or four coupled micro-rings made from layered III-V or II-VI hetrostructure material can aid in maintaining cross-talk at very low levels while employing simple switch addressing methods.

Electrically Tunable Microresonators Using Photoaligned Liquid Crystal

In one example embodiment, the present innovations include an integrated optical device comprising a substrate, optical waveguide, an optical microresonator, a photoalignment layer and liquid crystal film, a rubbed polyimide layer, and a pair of vertical electrodes that apply a localized electrical potential difference across the device. An optical input signal is coupled to the microresonator to form an optical output signal. The center wavelength of the output signal is electrically tuned over multiple free spectral ranges of the microresonator.

This electrooptically tunable waveguide-coupled microresonator switch architecture is implemented on a dielectric substrate (silicon or silicon-nitride or silicon oxynitride) with photoaligned liquid crystal film as cladding layers. Liquid crystal alignment on this topological device surface is primarily affected by the alignment material. At zero applied electrical potential, the liquid crystal film is orientated by the bottom photoalignment layer and the top rubbed planar or homeotropic polyimide layer. Under an applied electric field vertically across the layered device structure, the liquid crystal molecules are re-orientated with a tilt angle that depends on the applied field. The liquid crystal cladding refractive index is then varied according to the applied voltage, and subsequently the microresonator resonance wavelengths are tuned.

The disclosed innovations, in various embodiments, provide one or more of at least the following advantages:
Fabrication using existing technology;
Increased tunability of switch;
Enhanced refractive index tuning range in cladding near edges;
Enhancement of the tuning range of the refractive index by varying the thickness and exposure time of the liquid crystal photoaligning layer;
Producing of highly uniform liquid crystal alignment on the microring resonator, thus improving the quality and reliability of switching.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4(b) shows a zoom-in view of the coupling region showing a typical gap separation.

FIG. 4(c) shows a cross-sectional view of a straight waveguide.

FIG. 5 shows a photosensitive sulfuric azo-dye SD1 molecule formula

DETAILED DESCRIPTION OF THE PREFERRED EMBODIMENTS

Figure 1:
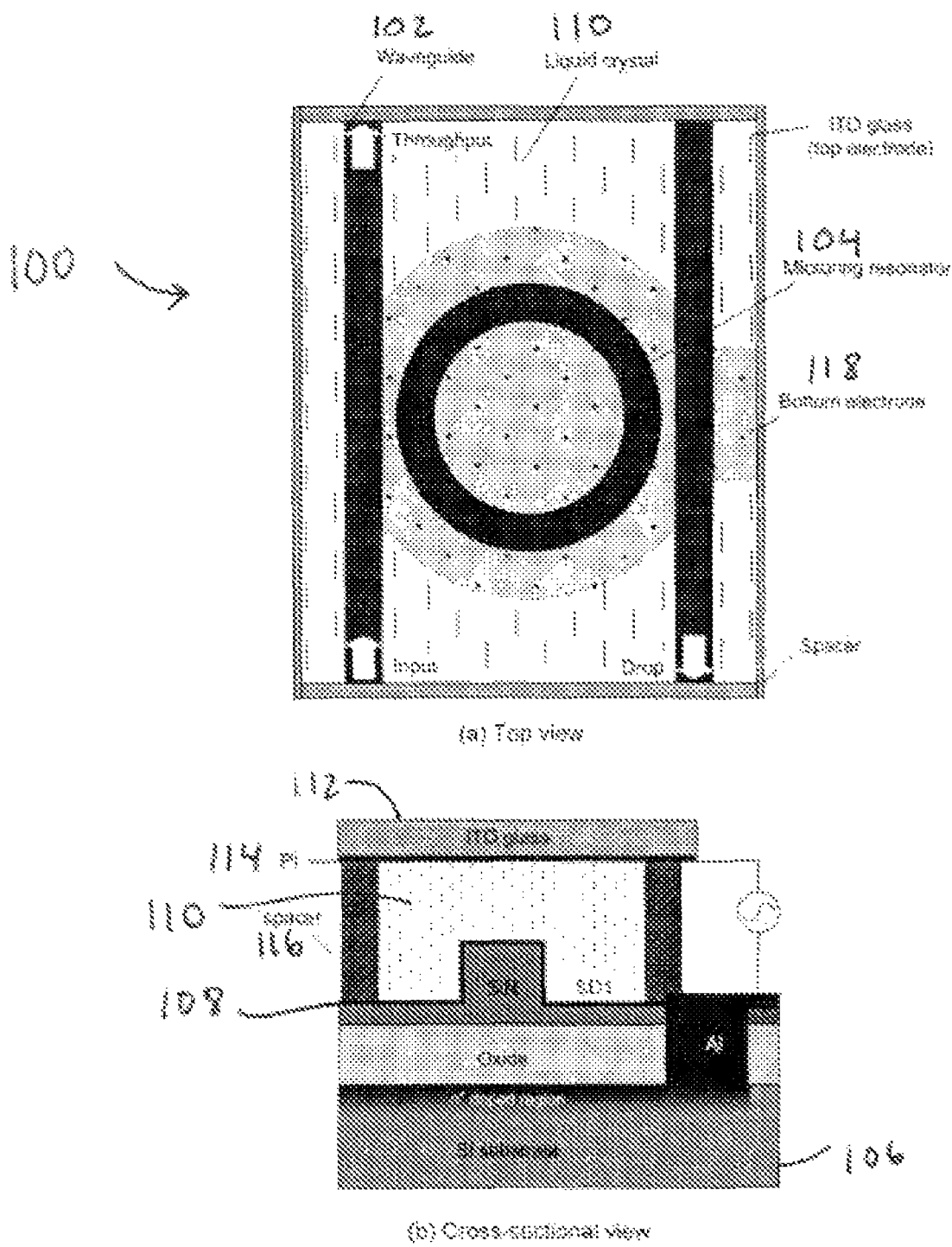
FIG. 1(a) shows a top-view schematic of the device. The micrometer-size silicon nitride (SiN) ring resonator is optically coupled with a single-mode silicon nitride waveguide. The entire device is coated with a photosensitive alignment layer (SD1) and liquid crystal as upper cladding. An indium-tin-oxide (ITO) glass coated with rubbed polyimide (PI) layer covers the liquid crystal as the top electrode. A highly-doped region is positioned underneath the silica (oxide) cladding as the bottom electrode. Aluminum (Al) wires are used to enable ohmic contact with the bottom electrode.
FIG. 1(b) shows an across-sectional view schematic of the device (across a single waveguide).

The numerous innovative teachings of the present application will be described with particular reference to the presently preferred embodiment (by way of example, and not of limitation).

The present innovations include, in one example embodiment, an electrooptically tunable waveguide coupled microresonator. In preferred embodiments (described more fully below), the innovative device includes a photoalignment layer as part of the cladding, which is in turn covered by a liquid crystal region. Non-flat surfaces, such as the surface of a silicon chip with waveguides and microring resonators described herein, have edge profiles that cause intrinsic alignment of liquid crystal. This alignment causes the LC director to take a fixed position in the region near the evanescent field, or close to the resonator and waveguide (which are formed as relatively tiny surface structures, and thus have edges). The director is held at this position at a certain strength that can be described in terms of anchoring energy. Thus, the value of the cladding refractive index is dependent on the value of the anchoring energy.

In example embodiments of the present innovations, the LC orientation of the cladding is preferably modified by application of an electric field, particularly in the region of the evanescent field and coupling between resonator and waveguide (i.e., near and at the edges of the surface profile). The anchoring effect here is usually strong in both azimuthal and polar planes.

The present innovations preferably include introducing a photoalignment layer to partially compensate the anchoring effect of the profile in, for example, the azimuthal plane. In preferred embodiments, a photoalignment layer is applied with alignment direction perpendicular to the alignment of the profile. Thus, the LC at the surface can be reoriented much more easily within the evanescent field range. In other embodiments, patterned photoalignment can be used to achieve proper alignment around the ring resonator.

Application of a photoalignment layer, as taught in preferred embodiments of the present innovations, allows modification and/or control of the alignment of LC molecules on top of the microring resonator, where other methods (such as mechanical alignment methods) fail or cannot be implemented.

For example, typical microring resonators are on the order of a micron or submicron range in size. Hence, for example, with respect to mechanical methods of alignment, such as adding a rubbed polyimide layer, the act of making the structural modification to the polyimide surface cannot be achieved on the tiny surface of the microring resonator.

The present innovations thus offer an alternative approach to electrically tuning waveguide-coupled microresonators by using photoaligned liquid crystals as cladding. Electrical tuning is achieved by changing the liquid crystal refractive index under an applied electric field, thereby tuning the microresonator resonance wavelengths. The novel application of photoaligned liquid crystals as cladding layers on the microresonator allows better control of the liquid crystal alignment (particularly at the crucial profile edges) and enhances cladding refractive index tuning range.

The present innovations can be implemented in a number of systems, including arrays of filters and switches, as described more fully below. The following examples are exemplary embodiments, and show only specific example implementations of the present innovations. These examples are not intended to limit the scope of the present innovations or the possible ways in which the present innovative concepts may be applied or implemented. The given examples are intended to be illustrative only.

FIG. 1(a) shows a top-view schematic of an electrically tunable waveguide-coupled microresonator 100 using a photoaligned liquid crystal cladding layer. The optical waveguide 102 and microresonator 104 are formed on a silicon-nitride-on-silica (SiN-on-SiO$_2$) substrate 106. The micrometer-size ring resonator 104 is optically coupled to a lateral single-mode waveguide 102. The microresonator-coupled waveguide transmission is highly sensitive to the wavelength and is greatly reduced at wavelengths that are resonant with the microresonator (i.e. the ring circumference approximately corresponds to and integer number of the guided wavelength). The entire silicon nitride device is coated with a thin film (nanometer thickness) of photosensitive alignment layer 108 and by liquid crystal 110 as the upper cladding. An indium-tin-oxide (ITO) glass 112 coated with rubbed polyimide (PI) layer 114 covers the liquid crystal as the top electrode. Spacers 116 are used to form the liquid crystal cell. On the silicon substrate and directly underneath the device silica lower cladding layer, a highly-doped region is positioned to act as the bottom electrode 118. FIG. 1(*b*) shows the cross-sectional view of the device.

Figure 2:
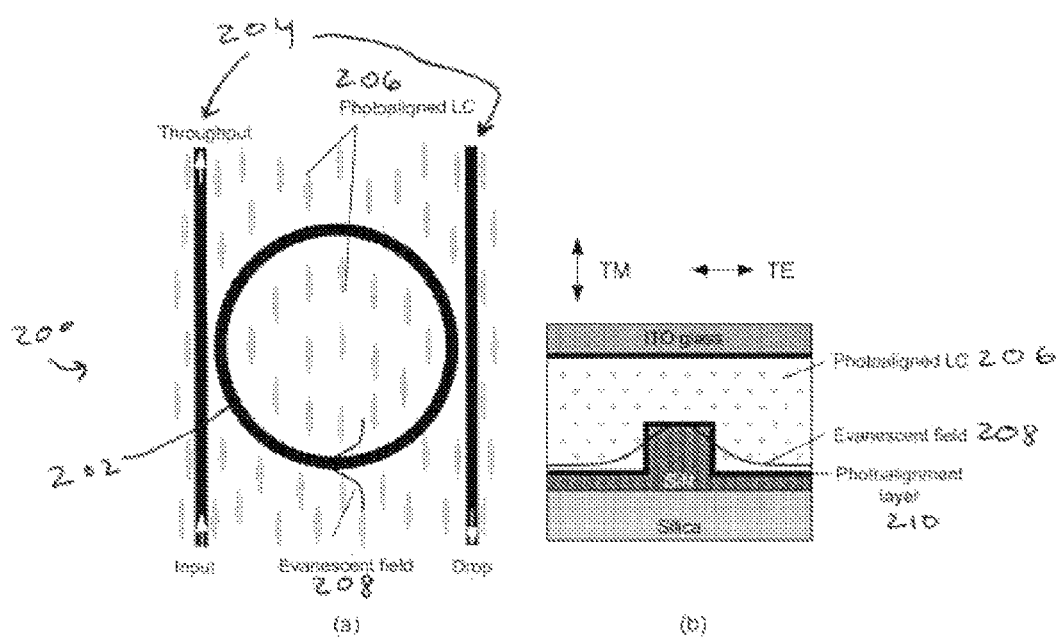
FIG. 2(a) shows a top-view schematic of the liquid crystal orientation and distribution, with planar oriented liquid crystal molecules in the direction of the straight waveguide.
FIG. 2(b) shows a cross-sectional-view schematic of a straight waveguide covered with planar-orientated liquid crystal molecules.

FIG. 2(*a*) shows a top view of the device 200, depicting the microring resonator 202, waveguides 204, and photoaligned LC layer 206. Evanescent field 208 is shown in FIG. 2(*b*), which gives a cross-sectional view of part of the device. It is noted that FIG. 2(*b*) shows only one edge of resonator 202 and immediate vicinity. Photoalignment layer 210 is shown beneath photoaligned LC 208. In FIG. 2, the LC is aligned parallel with the substrate as shown.

Figure 3:
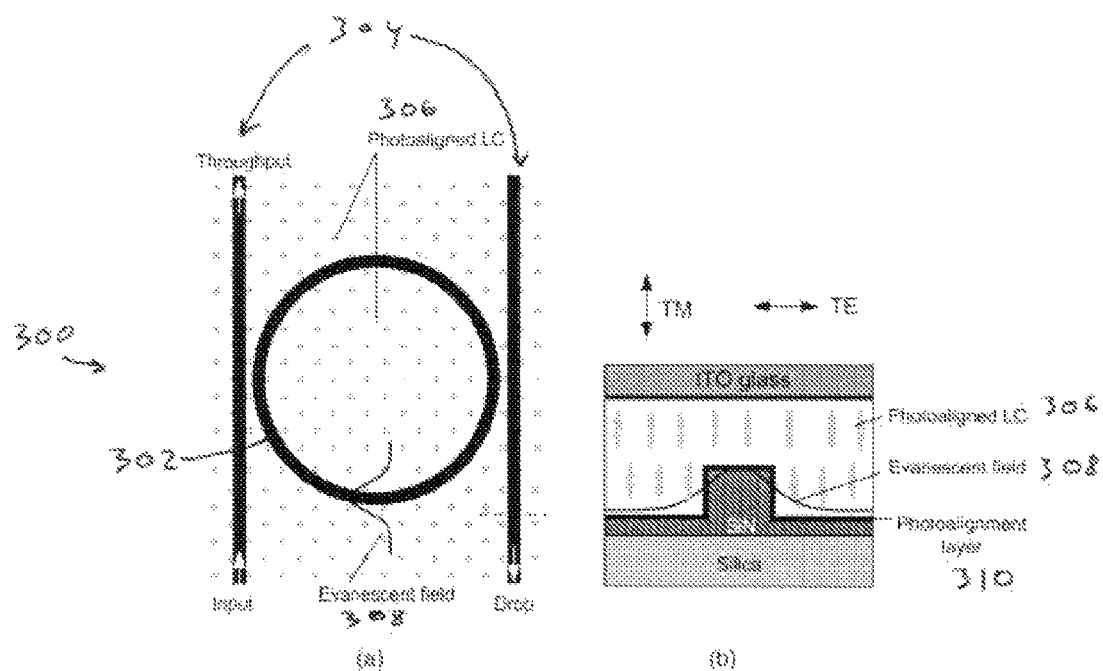
FIG. 3(a) shows a top-view schematic of the liquid crystal orientation and distribution with vertically orientated liquid crystal molecules.
FIG. 3(b) shows a cross-sectional-view schematic of a straight waveguide covered with vertically-orientated liquid crystal molecules.

FIG. 3(*a*) shows a top view of the device 300, depicting the microring resonator 302, waveguides 304, and photoaligned LC layer 306. Evanescent field 308 is shown in FIG. 3(*b*), which gives a cross-sectional view of part of the device. It is noted that FIG. 3(*b*) shows only one edge of resonator 302 and immediate vicinity. Photoalignment layer 310 is shown beneath photoaligned LC 308. In FIGS. 3, the LC is aligned perpendicular with the substrate as shown.

At zero applied electrical potential, the liquid crystal molecules are oriented according to the photosensitive alignment layer and the rubbed PI layer (planar orientated; in the direction of the waveguide, as shown in FIG. 2). Under an applied electrical potential across the two electrodes, the liquid crystal molecules are rotated according to the electric field direction (vertically orientated, as shown in FIG. 3). This results in changes in the cladding refractive index for particular polarization modes of the guided light. (We caution that due to the strong anchoring effect of the waveguide profile, the liquid crystal molecules in close proximity to the waveguide are likely to be partially aligned by the waveguide surface, instead of strictly following the photoalignment layer.)

For TM-polarized mode, the light electric field is perpendicular to the device plane, and thus in the absence of applied electrical potential the guided mode evanescent field in the cladding sees the ordinary refractive index $n_o$~1.5 of the planar oriented liquid crystal optic axis (FIG. 2). With an applied potential across the two vertical electrodes, the liquid crystal optic axis rotates with a particular tilt angle between 0-90 degrees. For a 90 degree tilt angle, the TM-polarized light in the evanescent field then sees the extraordinary refractive index of $n_e$~1.7 of the vertically oriented liquid crystal optic axis (FIG. 3). Thus, the liquid crystal cladding refractive index experienced by the TM-polarized mode evanescent field spans from $n_o$ to $n_e$ with increasing applied electrical potential. Consequently, the effective refractive index of the ring waveguide is increased, and the resonance wavelengths are redshifted.

For TE-polarized mode, the light electric field is parallel to the device plane, and thus in the absence of applied electrical potential, the straight waveguide mode evanescent field in the cladding sees the ordinary refractive index $n_o$ (FIG. 2). Yet, in the microring resonator, the TE-polarized mode electric field is in the radial direction. The cladding refractive index that the evanescent wave sees thus varies with the angular position along the ring waveguide, between $n_o$ and $n_e$. For example, near the two straight waveguide coupling regions, the liquid crystal director is near orthogonal to the electric field, thus the cladding refractive index is near $n_o$. Whereas near the two polar regions about 90 degree away from the straight waveguides, the liquid crystal director is near parallel to the electric field, thus the cladding refractive index is near $n_e$. In other angular positions along the ring microresonator circumference, the cladding refractive index is a superposition of $n_o$ and $n_e$.

For a 90 degree tilt angle under an applied electrical potential, the TE-polarized light in the evanescent field then sees the ordinary refractive index of $n_o$ of the vertically oriented liquid crystal optic axis (FIG. 3). Thus, the liquid crystal cladding refractive index $n_{clad}$ experienced by the TE-polarized mode evanescent field spans from $n_o < n_{clad} < n_e$ to $n_o$ with increasing applied electrical potential. Consequently, the effective refractive index of the ring waveguide is decreased, and the resonance wavelengths are blueshifted.

In further embodiments, other types of planar microresonators, such as racetrack and other non-circular microring resonators, and circular and non-circular (e.g. polygonal) microdisk resonators, etc may be used. The silicon nitride core can be replace with silicon oxynitride (SiON) that has a refractive index exceeding the liquid crystal film.

Figure 4:
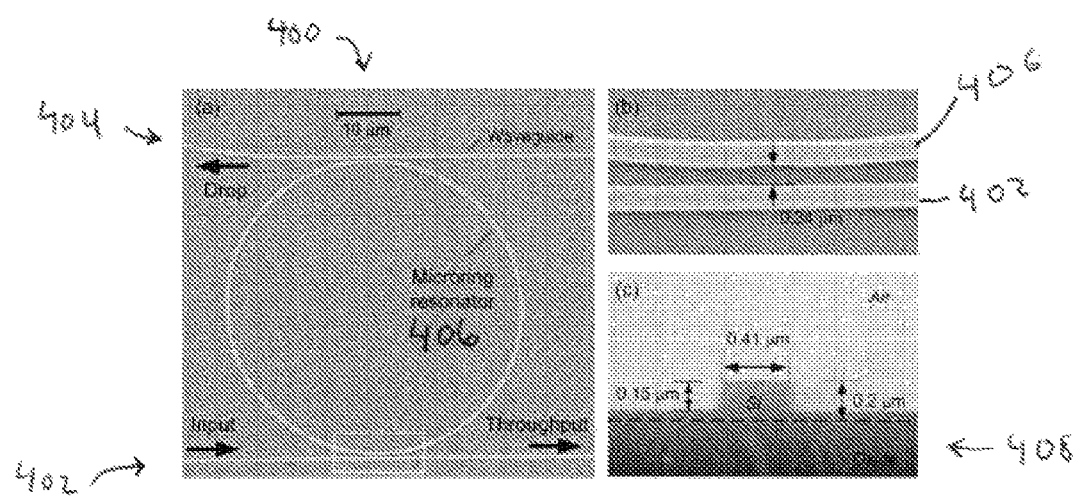
FIG. 4 (a) shows a ccanning electron micrograph (top view) of a fabricated microring resonator coupled to two parallel waveguides on a silicon-on-insulator substrate.
Figure 3:
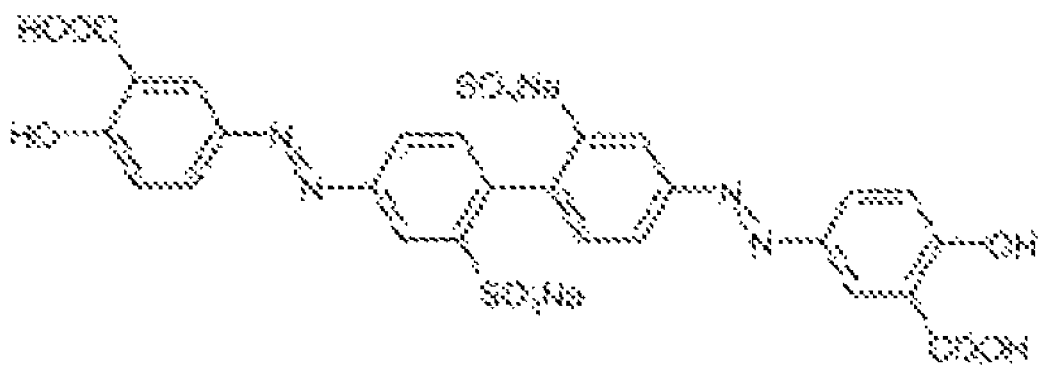

In order to elucidate the liquid-crystal cladding dependent resonant transmission, we performed a proof-of-principle experiment using photoaligned liquid crystal on parallel waveguides coupled microring resonators (in the form of a channel add-drop filter) fabricated on a silicon-on-insulator (SOI) wafer FIG. 4(*a*) shows a top-view scanning electron micrograph of the air-clad channel add-drop filter 400, comprising two straight waveguides 402, 404 and one laterally coupled 50-µm-size microring resonator 406 on a silicon-on-insulator substrate 408. The device was patterned by i-line (365 nm) photolithography, and etched by reactive-ion etching. The two straight waveguides are positioned in close proximity to the microring resonator for evanescent coupling. FIG. 4(*b*) shows the zoom-in view scanning electron micrograph of one of the coupling regions where resonator 406 and waveguide 402 are in proximity. The fabricated gap spacing for the evanescent coupling is 0.34 µm at the minimum separation. FIG. 4(*c*) shows the cross-sectional view scanning electron micrograph of a typical straight waveguide. The waveguide width is approximately 0.41 µm and the waveguide height is 0.2 µm, with the etched depth around 0.15 µm. The silica under cladding layer is 3-µm-thick. In order to prepare the photoaligned liquid-crystal-clad filler, a 20mm-thick photosensitive alignment layer of sulfuric azo-dye, SD-1 (FIG. 5), is spin-coated with 4000 rpm for 40 sec. This procedure allows uniform step-coverage for the device surface with ~20 nm thickness of the alignment layer. It is known that SD-1 molecules possess the absorption oscillator parallel to their long axis and is aligned by a polarized UV light. Treated in linearly polarized UV light, the alignment layer is orientated parallel to the straight waveguide in the bulk region and the waveguide top surface. However, in the proximity of the waveguide sidewalls, the alignment layer is likely to be orientated by itself (surface profile alignment) parallel with the sidewall (and parallel to the substrate).

The nematic liquid crystal E7 (Merck) is sandwiched between the bottom SD-1 alignment layer and the top indium-tin-oxide (ITO) glass (with a rubbed PI layer) with thickness of approximately 5 µm. The orientation of the liquid crystal molecules is largely determined by the SD-1 alignment layer that possesses exposure-controlled anchoring energy. (Yet, in the absence of this SD-1 alignment layer, the liquid crystal molecules in the bulk region are randomly orientated, and only near the waveguide edges the liquid crystal molecules are orientated parallel to the waveguides due to their strong anchoring by the waveguide profile.) Thus, the liquid crystal molecules overlaid on top of the device are uniformly distributed and orientated in the direction of the straight waveguides (only in the close proximity to the waveguide corner regions, they are probably orientated by the waveguide profile)

Figure 6:
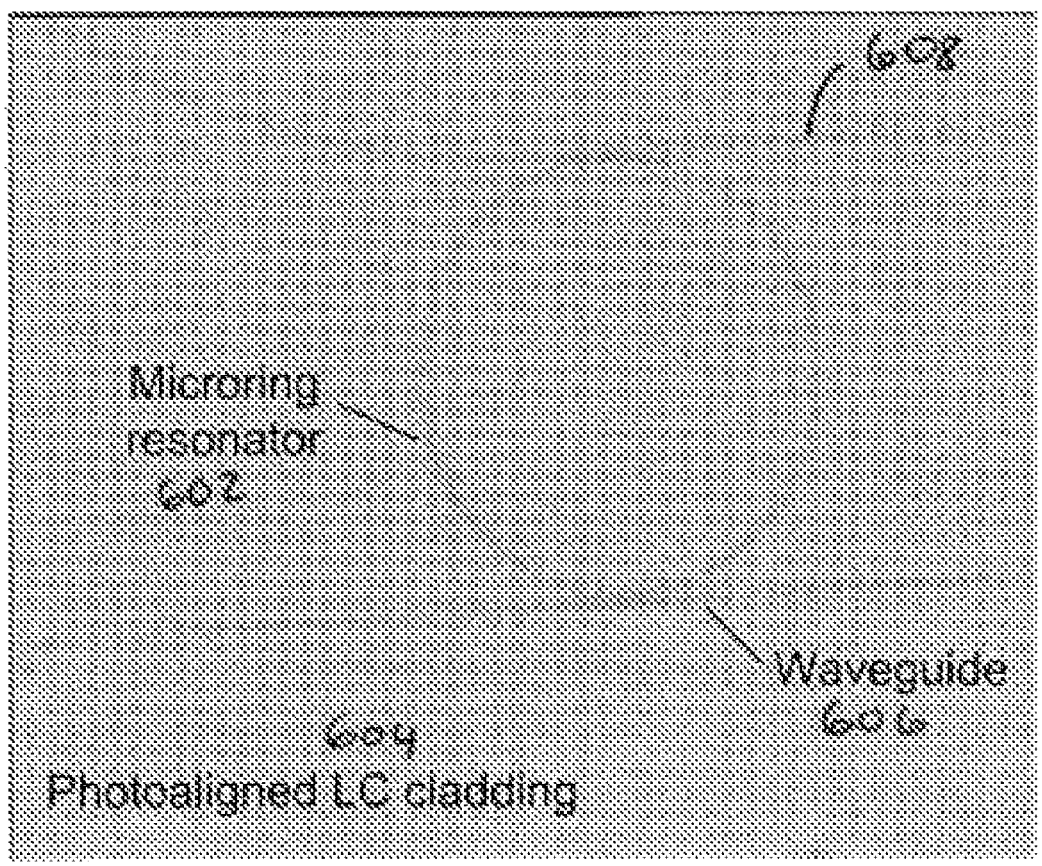
FIG. 6 shows an optical micrograph of the ring resonator on silicon-on-insulator substrate with photoaligned liquid crystal.

FIG. 6 shows an optical micrograph of the ring resonator 602 on silicon-on-insulator substrate with photoaligned liquid crystal cladding 604. Waveguides 606, 608 are also shown.

In our initial proof-of-principle experiment, laser light in telecommunication wavelengths from an external-cavity wavelength-tunable diode laser is end-fired to the waveguide input-port using a lensed-tapered polarization-maintaining single-mode fiber (spot diameter ~2.5 µm). The input waveguide has a lateral taper end face of ~2 µm wide. The waveguide output ports are imaged by a microscope objective lens (NA 0.65) onto a scanning 62.5-µm-core multimode fiber after a TM/TE analyzer. The collected light is lock-in detected by using a photodiode.

Figure 7:
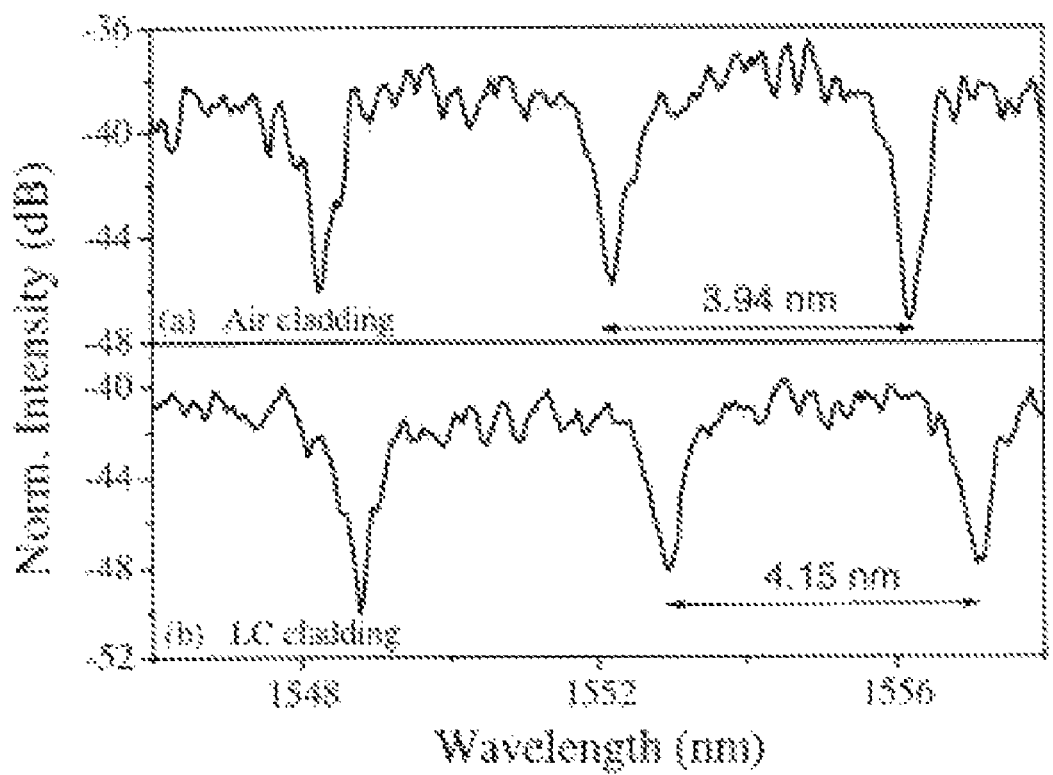
FIG. 7 shows the measured TE-polarized throughput-port transmission spectra of the microring resonator with (a) air cladding, and (b) planar orientated liquid crystal cladding (preferentially aligned in the waveguide direction).

FIG. 7(a) shows the measured TE-polarized (electric field parallel to the chip) throughput-port spectrum of a fabricated device with air cladding layer. Single-mode resonances are discerned from the spectrum. The free spectral range (FSR), the wavelength difference between two adjacent resonances, is approximately 3.94 nm near 1550 nm wavelength. It is known that the FSR expands with the cladding refractive index.

FIG. 7(b) shows the measured TE-polarized throughput-port spectrum with the photoaligned liquid crystal cladding layer. In contrast with FIG. 7(a) (air cladding), the FSR near 1550 nm is expanded to 4.15 nm, an increment of 0.21 nm (5.3%). The FSR expansions, and the resonance wavelength (red)shifts, are due to the reduced refractive index contrast between the ring waveguide core and the liquid crystal cladding. (Here we only characterize the TE-polarized mode because the 0.2-micron-height silicon waveguides in the TM polarization are prohibitively lossy.)

Figure 8:
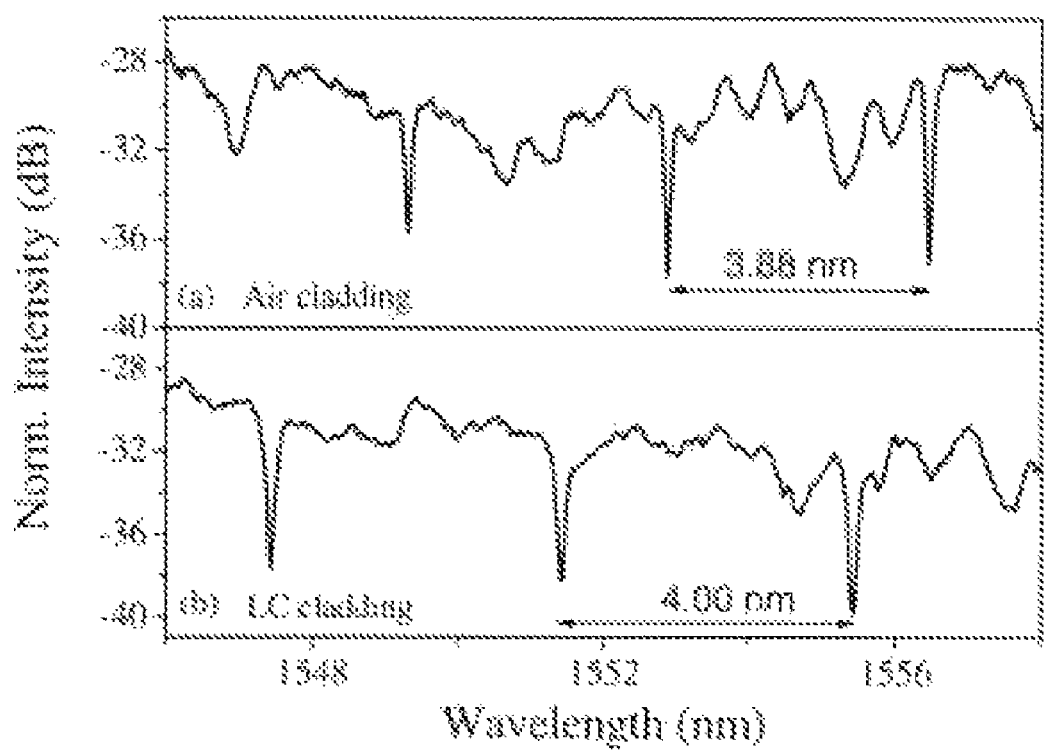
FIG. 8 shows the measured TE-polarized throughput-port transmission spectra of the microring resonator with (a) air cladding, and (b) vertically orientated liquid crystal cladding.

In another embodiment, the SD-1 alignment layer is first treated with intense unpolarized UV light, such that the liquid crystal molecule director is perpendicular to the device plane. FIGS. 8(a) and 8(b) show the measured TE-polarized throughput-port transmission spectra with air cladding and vertically oriented liquid crystal cladding. The measured FSR near 1550 nm with air cladding is 3.88 nm. The slight difference in FSR with the previous air-clad sample (FIG. 7(a)) is due to fabrication deviations among different devices of the same design parameters. The measured FSR near 1550 nm with vertically oriented liquid crystal cladding is expanded to 4.00 nm, an increment of 0.12 nm (3.1%). Compared with the case of liquid crystal planar orientation (FIGS. 7(a) and 7(b)), the vertically orientated liquid crystal cladding imposes less FSR expansion relative to the air-clad filter and also less resonance wavelength shifts. (From the FSR expansion with the vertical liquid crystal orientation, we deduce $n_o$~1.48.)

The liquid crystal clad microring resonator described here acts as an evaluation of the influence of various liquid crystal orientations on the optical resonator performance. Based on our initial measurements, the FSR is differed for ~2% between the planar and vertical oriented liquid crystal cladding, thus suggesting a relative resonance wavelength shift of ~25 nm.

In such configuration as described above, only liquid crystal molecules that are located within the evanescent field plays role for tuning of LC cladding. This LC volume is related to surface processes that operate significantly faster that regular bulk switching of liquid crystals. Thus, the operation speed of electrically tunable microresonators using photoaligned liquid crystals as cladding layers is expected to be in the scope of 100 ns-100 ms.

Figure 9:
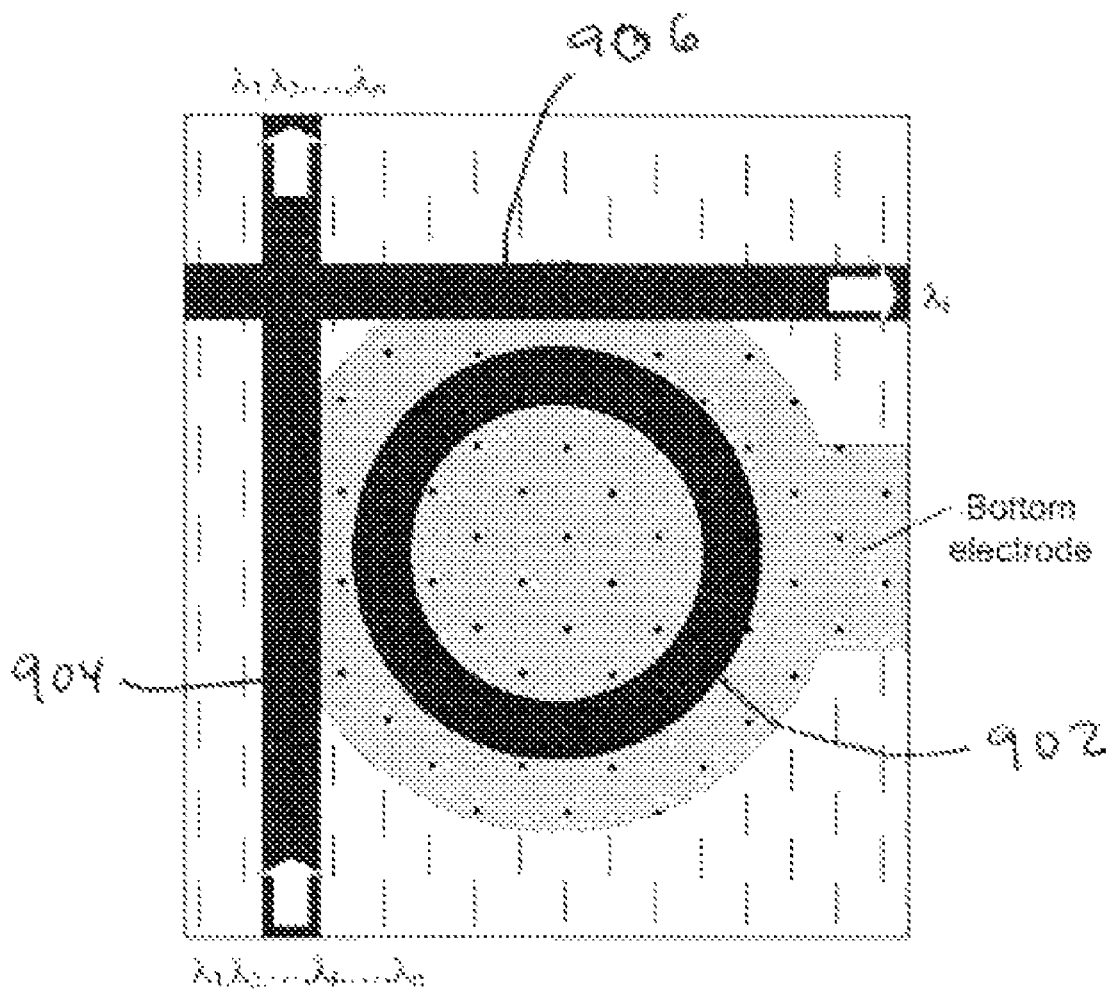
FIG. 9 shows a top-view schematic of the electrically tunable waveguide-crossing-coupled microring resonator with photoaligned liquid crystal cladding layers.

As a further embodiment, a waveguide crossing coupled with a microring resonator 902 can be constructed as in FIG. 9, which serves as a node of a switch array in WDM network. In this example, waveguides 904, 906 cross such that wavelength lambda (i) is filtered out of the incoming wavelengths lambdas (1 through n).

Figure 10:
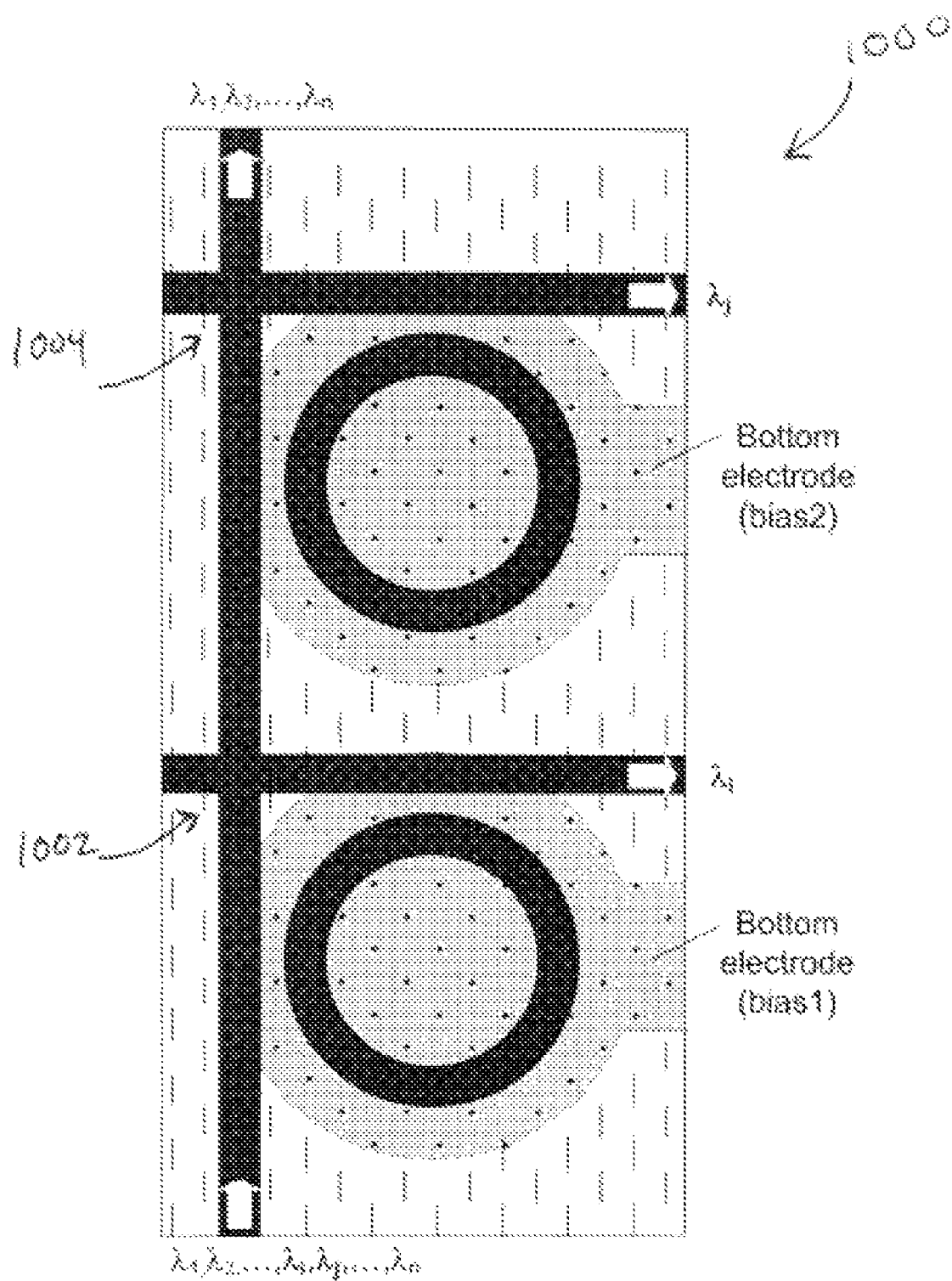
FIG. 10 shows a top-view schematic of the cascaded waveguide-crossing network. In each crossing node, the microring resonator with photoaligned liquid crystal cladding layers can be separately tuned by the photolithographically patterned bottom electrode.

In yet other embodiments, for example, that of FIG. 10, tunable multi-wavelength waveguide cross-connect networks 1000 can be constructed, of which each crossing node 1002, 1004 is formed by a single-mode waveguide crossing coupled with a micrometer-size ring resonator on a semiconductor chip, which can provide multiwavelength switching and routing in a compact and planar configuration. Beneath each microresonator, there is a photolithographically patterned highly-doped region, such that each node can be separately tuned by the voltage applied on its bottom electrode. In this example, it is noted that bias 1 provides capability to filter a first wavelength from incoming wavelengths, while bias 2 provides capability to filter a second wavelength from incoming wavelengths.

Figure 11:
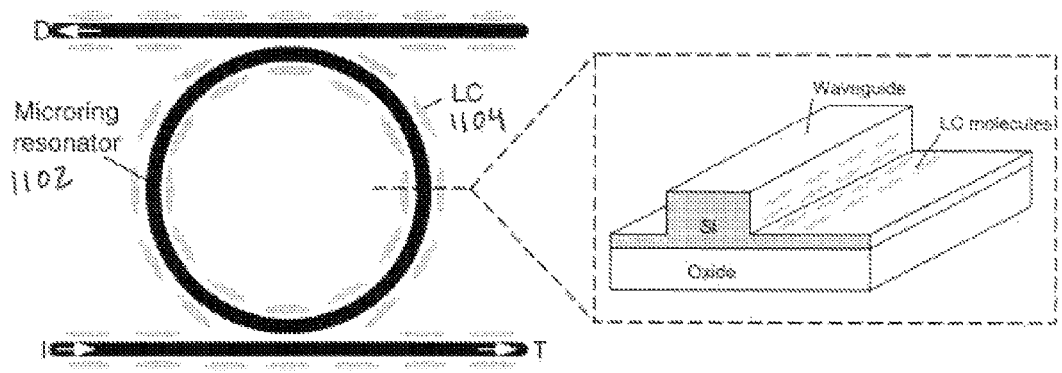
FIG. 11 shows liquid crystal alignment near edges of a microring resonator structure.

As mentioned above, the LC molecules near the waveguide corners of a device (such as the edges of a resonator or waveguide formed on a semiconductor substrate) align with the edges of the structure. This is shown in FIG. 11. Microring resonator 1102 is covered with LC material having molecules 1104, which align themselves with nearby edge structures. In this example, molecules 1104 align concentrically with the ring resonator 1102. This caused strong anchoring of the LC molecules, reducing their tendency to realign under the effects of an applied electric field.

Figure 12:
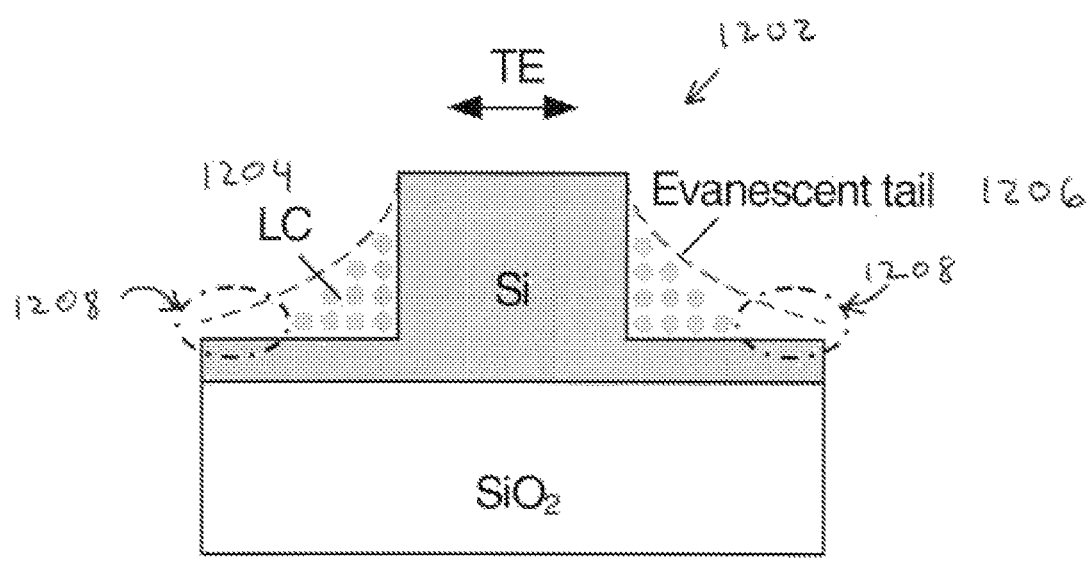
FIG. 12 shows a cross-section view detailing an example of liquid crystal anchoring and evanescent fields.

FIG. 12 shows a cross-section view of a silicon waveguide 1202 (for example, one part of a microring resonator). In this example, because of edge aligning effects, the LC molecules 1204 within the evanescent field 1206 are anchored parallel with the edges. Molecules which are strongly anchored 1204 are less susceptible to reorientation under applied electric fields. Only molecules farther from the edges 1208 yet within evanescent field 1206 can be easily reoriented. However, this is a relatively small percentage of the relevant molecules, which means of the light coupled via evanescent field, only a small amount of that light passes through material that undergoes significant index of refraction change under the applied field. This reduces the ability of the applied field to tune the device.

Figure 13:
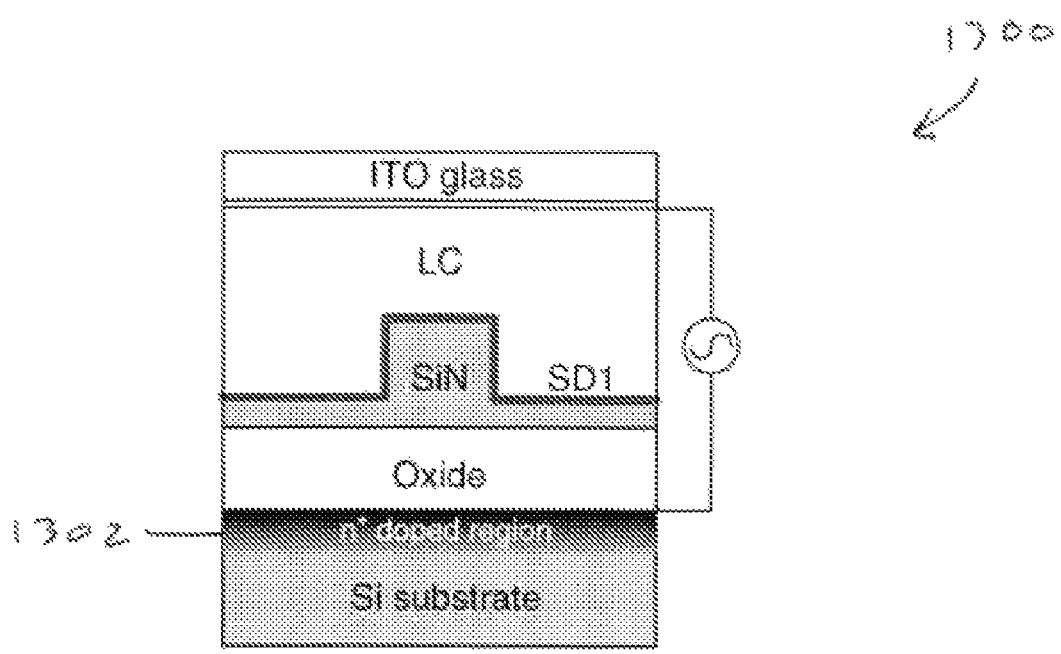
FIG. 13 shows an alternative embodiment of the present innovations.

FIG. 13 shows another embodiment of the present innovations. In this example, the device 1300 uses a doped region 1302 as a bottom electrode. Other configurations are also possible.

Figure 14:
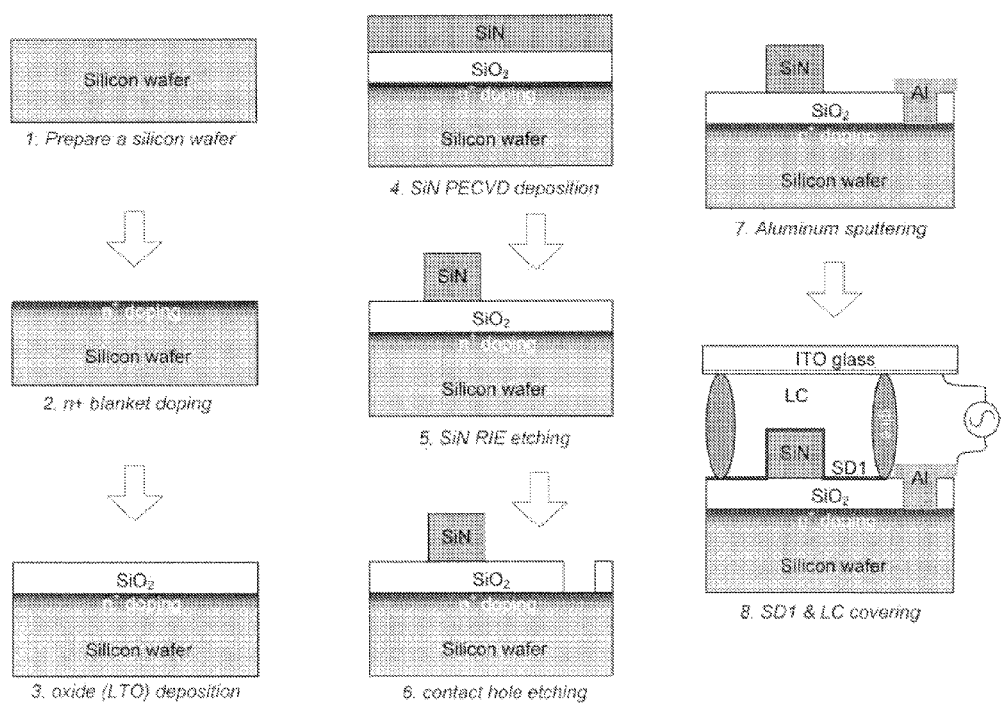
FIG. 14 shows fabrication process phases of a device consistent with implementing embodiments of the present innovations.

FIG. 14 shows steps in a process for creating a device consistent with a preferred embodiment of the present innovations. In this example, the process starts with (1) preparation of a silicon wafer. This is followed by (2) blanket n+ doping, then (3) oxide deposition to form a layer of $SiO_2$ on the surface. Next, (4) SiN is deposited by PECVD deposition. This layer is then (5) etched to create the body of the waveguide on the surface. Contact hole etching (6) forms an area where (7) aluminum sputtering can deposit Al to serve as a contact. The device is completed (8) with deposition of the photoalignment layer (SD1 in this case) and liquid crystal covering to form the upper cladding, while rubbed polyimide and ITO glass are used to form a top electrode contact. Spacers separate the contacts.

Figure 15:
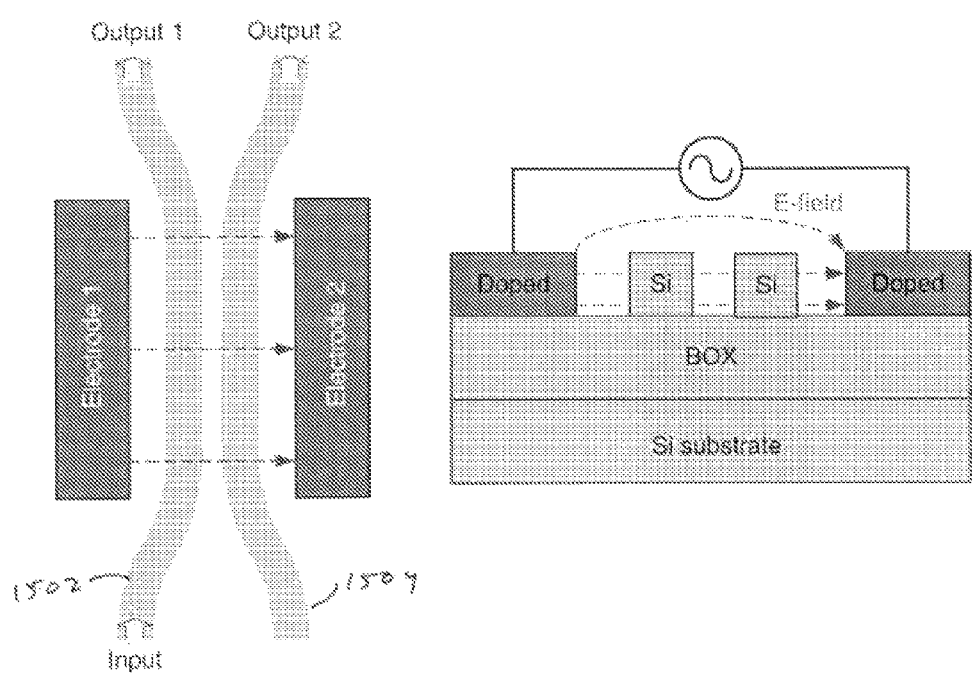
FIG. 15 shows an example embodiment of a directional coupler, consistent with an embodiment of the present innovations.

FIG. 15 shows an alternative embodiment, using a directional coupler. In this example, Electrode 1 and Electrode 2 are preferably formed from doped semiconductor material, and are positioned on either side of waveguides 1502, 1504. The electric field generated between the two electrodes influences the index of refraction, and coupling, between the waveguides, as described above.

Figure 16:
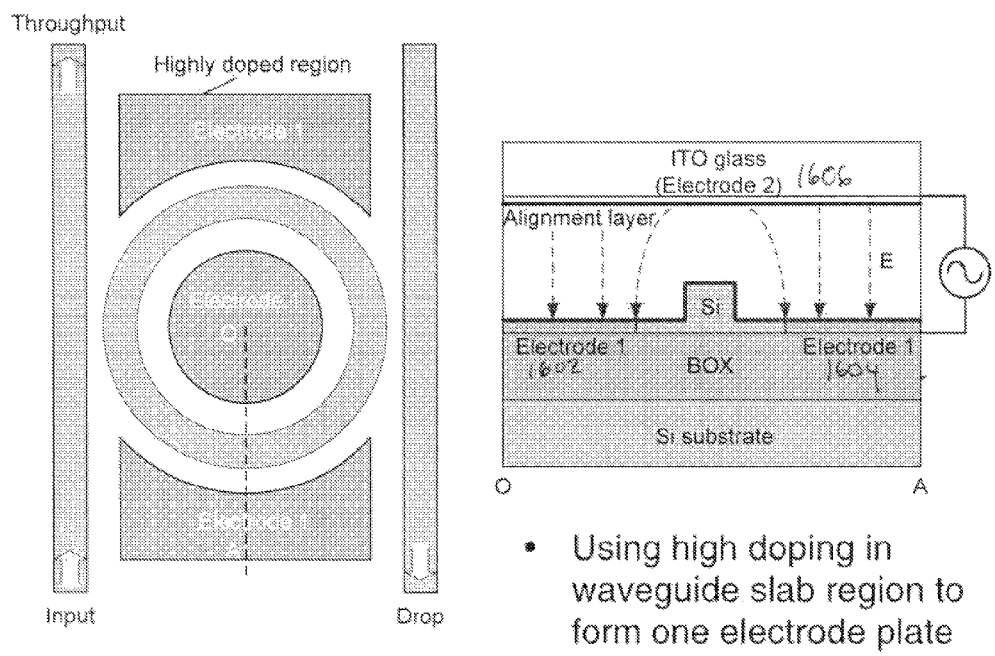
FIG. 16 shows an example embodiment of a resonator consistent with an embodiment of the present innovations.

FIG. 16 shows another example embodiment of the present innovations. In this example, high doping in the waveguide slab region forms one of the electrode plates (shown in two parts 1602, 1604 on either side of the waveguide). The top electrode 1606 is shown above.

Figure 17:
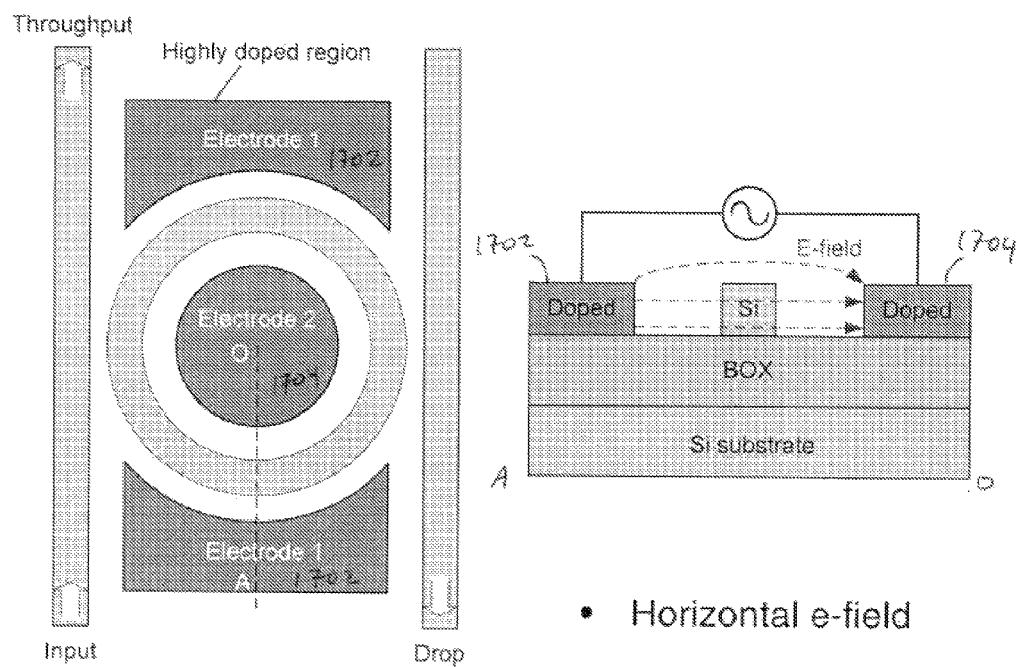
FIG. 17 shows an example embodiment of a resonator consistent with an embodiment of the present innovations.

FIG. 17 shows another example of the present innovations. In this example, electrode 1 1702 comprises two doped regions on the outside of the ring resonator. Electrode 2 1704 comprises an island formed within the resonator's boundaries.

Other arrangements and embodiments, are of course possible, and those given are only intended to be exemplary and not limiting of the potential applications of the disclosed innovations.

According to a disclosed class of innovative embodiments, there is provided: An optical device, comprising: a resonator; a waveguide coupled to the resonator; a photoalignment layer formed on the resonator.

According to a disclosed class of innovative embodiments, there is provided: A method of fabricating an optical device, comprising the steps of: forming a resonator on a substrate in proximity to a waveguide; forming a photoalignment layer on the surface of the resonator; forming a liquid crystal layer on the photoalignment layer such that the photoalignment layer influences alignment of molecules of the liquid crystal layer.

According to a disclosed class of innovative embodiments, there is provided: An electrically tunable micro-resonator using photoaligned liquid crystal as cladding layers, where a photoalignment layer on the device surface define the orientation of the liquid crystal molecules, and the transmission property of the waveguide-coupled micro-resonator is electrically tuned by varying the cladding refractive index under an applied electric field in the vertical direction.

According to a disclosed class of innovative embodiments, there is provided: A method of using an optical device, comprising the steps of: inserting light into a resonator via a waveguide that is coupled to the resonator; tuning the resonator's free spectral range by applying an electrical field; wherein changes in index of refraction of a liquid crystal cladding of the resonator is enhanced by a photoalignment layer formed on the resonator.

According to a disclosed class of innovative embodiments, there is provided. An optical system, comprising: a resonator formed on a semiconductor substrate; a waveguide formed in proximity to the resonator; electrodes positioned in proximity to the resonator such that an electric field can be applied across the resonator; a cladding on the resonator, wherein the cladding comprises a photoalignment layer.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, in one embodiment, nematic liquid crystal is used. In another embodiment, ferroelectric liquid crystal is used. In other embodiments, the photoalignment layer is photosensitive sulfuric azo-dye (SD-1). In some embodiments, the photoalignment layer exhibits the dichroic bands in the region between 200 nm and 1000 nm.

The microring resonator can be of different varieties, including a microring that is circular shaped. It can also be polygonal, racetrack, and other shapes. It can also be a disk resonator. The resonator can also be a non-circular disk resonator. The waveguides and resonators can be connected in various ways. For example, the microresonator can be horizontally coupled with one waveguide, multiple waveguide, crossed waveguides, or waveguide cross-connected networks. The microresonators and waveguides can be fabricated of silicon, silicon nitride, silicon oxynitride, or other substrates, for example.

The light propagating through the waveguides and resonator can be polarized in various ways (or not polarized), including TE and TM polarization.

The electrodes can be formed in various ways, including doping a layer of the substrate, etching and despositing a conducting material (such as aluminum), or forming a plate of indium-tin-oxide, for example.

The tuning made possible by the present innovations can vary depending on size, materials, and other factors. For example, in one embodiment, the free spectral range change is in a few percent and wavelength tuning range is within a few tens of nanometers. Other ranges are possible.

The resonant wavelength tuning can be of varying speeds, including high speed (100 ns to 100 ms), and can impose low power dissipation with high controllability.

For another example, in less preferred embodiments, other layers may be interposed between those described here. For example, in one less preferred embodiment, a layer is added between the resonator and the photoalignment layer (or between other layers). However, such a layer would deteriorate the characteristics of the device, particularly the tenability of the system. For example, unless the added layer is very thin, the distance where the refractive index of the cladding can be effectively switched will be decreased by such an added layer.

Additional general background, which helps to show variations and implementations, may be found in the following publications, all of which are hereby incorporated by reference:

A. Zhang, K. T. Chan, M. S. Demokan, V. W. C. Chan, P. C. H. Chan, H. S. Kwok, and A. H. P. Chan, "Integrated liquid crystal optical switch based on total internal reflection", Appl. Phys. Lett. 86, 211108 (2005).

In this paper, an integrated LC optical switch has been fabricated in silicon oxynitride waveguides grown on Si wafers. The switching properties of the optical switch have been characterized, which clearly demonstrate a limited switching behavior. Comparing the actual switching performance with the simulation result, it can be inferred that the achieved refractive index change of the LC in the experiment is too small. The complex anchoring condition in the etched groove and the small birefringence of the LC may be the cause of such a small refractive index change. It is believed that the switching performance can be improved by choosing a LC with a larger birefringence and by correctly anchoring the LC inside the etched groove of the switch structure.

B. Zhang, K. K. Li, V. G. Chigrinov, H. S. Kwok, and H. C. Huang, "Application of photoalignment technology to liquid-crystal-on-silicon microdisplays", JJAP 44, 3983-3991 (2005).

In this document, the application and characterization of photoalignment layers on silicon microdisplays was made. It was observed that both the rubbed and photoaligned microdisplays had comparable characteristics. They all showed good contrast due to good alignment of liquid crystal molecules. They all had a response time of about 10 ms, which is fast enough for video applications. The photoaligned and rubbed microdisplays characteristics were essentially the same and met active matrix LCD standards. The defects were greatly reduced in photoaligned microdisplays due to the noncontact nature of the photoalignment technology.

Xihua Li, Bladimir M. Kozenkov, Fion Sze-Yan Yeung, Peizhi Xu, Vladimir Chigrinov, and Hoi Sing Kwok, Liquid-Crystal Photoalignment by Superthin Azo Dye Layer, Jpn. J. Appl. Phys., 45, No. 1A, pp. 203-205 (2006).

In this paper, LC display cell based on a super-thin photo-aligned layer was demonstrated including the formation of a very neat "textile knitwear" and uniform alignment by a super-thin azo-dye SD-1 layer, which allows to avoid the spin-coating procedure. The photosensitivity of azo-dye after photo-alignment was further enhanced and "island" azo-dye structures onto the rough ITO surface can be prevented due to better adhesion of SD-1 molecules. Using this super-thin SD-1 layer as an alignment agent, the sufficiently high polar and azimuthal anchoring energy and an excellent electrooptical performance in TN and ECB LC cells can be obtained. The method allows to obtain a perfect LC photo-alignment in large or curved cells and compatible with roll to roll process, thus is very attractive for mass production. New LC devices, where very thin or curved surfaces are used can be developed based on this method.

Further example embodiments are described in the appendix attached hereto, which is hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for " are followed by a participle.

The claims as filed are intended to be as comprehensive as possible, and NO subject matter is intentionally relinquished, dedicated, or abandoned.

What is claimed is:

1. An optical device, comprising:
    a resonator having an edge profile and coupled with a waveguide through an evanescent field;
    a photoalignment layer disposed at least partially on the resonator edge profile; and
    a liquid crystal cladding layer disposed on the photoalignment layer and comprising molecules having a baseline orientation that is substantially influenced by an alignment of the photoalignment layer,
    wherein:
    the alignment of the photoalignment layer is substantially perpendicular to an anchoring alignment of the resonator edge profile, and
    the photoalignment layer is configured to facilitate tuning orientation of molecules in the liquid crystal cladding layer within a region of the evanescent field and a coupling region between the resonator and the waveguide if an electric field is applied across the liquid crystal cladding layer.

2. The optical device claim 1, wherein the photoalignment layer is disposed at least partially on an edge profile of the waveguide.

3. The optical device of claim 1, wherein the resonator comprises a micro-ring resonator.

4. The optical device of claim 1, further comprising a second resonator having a second edge profile, wherein the photoalignment layer is disposed at least partially on the second resonator edge profile.

5. A method of fabricating an optical device, the method comprising:
    forming, on a substrate in proximity to a waveguide, a resonator having a top surface, wherein the resonator is coupleable with the waveguide through an evanescent field;
    forming a photoalignment layer on the top surface of the resonator, wherein the photoalignment layer includes an alignment substantially perpendicular to an anchoring alignment of the resonator top surface; and
    forming a liquid crystal layer on the photoalignment layer, wherein the liquid crystal layer comprises molecules having a baseline orientation that is substantially influenced by the alignment of the photoalignment layer,
    wherein the photoalignment layer is configured to facilitate tuning orientation of the molecules in the liquid crystal layer within a region of the evanescent field and a coupling region between the resonator and the waveguide if an electric field is applied across the liquid crystal layer.

6. The method of claim 5, wherein the waveguide and resonator are positioned at least partially proximate to one another.

7. The method of claim 5, further comprising forming the photoalignment layer at least partially on the waveguide.

8. The method of claim 5, further comprising forming at least two electrodes on the optical device.

9. The method of claim 5, wherein the resonator comprises a micro-ring resonator.

10. An electrically-tunable micro-resonator coupleable with a waveguide through an evanescent field, the electrically-tunable micro-resonator comprising:
    a liquid crystal cladding layer;
    a top surface;
    a photoalignment layer, wherein:
        an alignment of the photoalignment layer is substantially perpendicular to an anchoring alignment of the top surface, and
        the photoalignment layer is configured to facilitate tuning orientation of molecules in the liquid crystal cladding layer within a region of the evanescent field and a coupling region between the resonator and the waveguide if an electric field is applied across the liquid crystal cladding; and
    one or more electrodes configured to vary a refractive index of the liquid crystal cladding layer under the applied electric field.

11. The electrically-tunable micro-resonator of claim 10, wherein the liquid crystal cladding comprises nematic liquid crystal.

12. The electrically-tunable micro-resonator of claim 10, wherein the liquid crystal cladding comprises ferroelectric liquid crystal.

13. The electrically-tunable micro-resonator of claim 10, wherein the photoalignment layer comprises photosensitive sulfuric azo-dye (SD-1).

14. The electrically-tunable micro-resonator of claim 10, wherein portions of the liquid crystal cladding in close proximity to one or more side edges of the electrically-tunable micro-resonator remain at least partially aligned by another anchoring alignment of side edges of the electrically-tunable micro-resonator.

15. The electrically-tunable micro-resonator of claim 10, wherein the photoalignment layer comprises dichroic bands in a region between 200 nm and 1000 nm.

* * * * *